United States Patent [19]

Sakurai

[11] 4,358,974

[45] Nov. 16, 1982

[54] METHOD AND APPARATUS FOR CONTROLLING THE FEEDING OF A BANDSAW BLADE OF HORIZONTAL BANDSAW MACHINES

[76] Inventor: Nobuo Sakurai, 14-2, Nishikanagawa 3-chome, Kanagawa-ku, Yokohama-shi, Kanagawa-ken, Japan

[21] Appl. No.: 160,223

[22] Filed: Jun. 17, 1980

[30] Foreign Application Priority Data

Jun. 18, 1979 [JP] Japan .................................. 54/75604

[51] Int. Cl.³ ...................... B23D 53/00; G06F 15/46
[52] U.S. Cl. ............................................ 83/13; 83/71;
83/72; 83/800; 83/801; 364/475
[58] Field of Search .................... 83/801, 800, 72, 71,
83/13; 364/475; 408/11

[56] References Cited

U.S. PATENT DOCUMENTS

| Re. 26,377 | 4/1968 | Whitmore | 83/800 |
| 1,372,903 | 3/1921 | Perkins et al. | 83/800 |
| 1,390,469 | 9/1921 | Stowell | 83/800 X |
| 3,754,490 | 8/1973 | Sata et al. | 83/800 |
| 4,016,787 | 4/1977 | Sugimoto | 83/72 X |
| 4,241,635 | 12/1980 | Sugimoto | 83/800 |

*Primary Examiner*—Frank T. Yost
*Attorney, Agent, or Firm*—Thompson, Birch, Gauthier & Samuels

[57] ABSTRACT

A method and apparatus for controlling the feeding of a band saw blade involves detecting the wear of the blade or changes in cutting resistance as a result of such wear during a cutting operation and controlling the feeding of the band saw blade in accordance with the detected wear or cutting resistance resulting from such wear.

4 Claims, 8 Drawing Figures

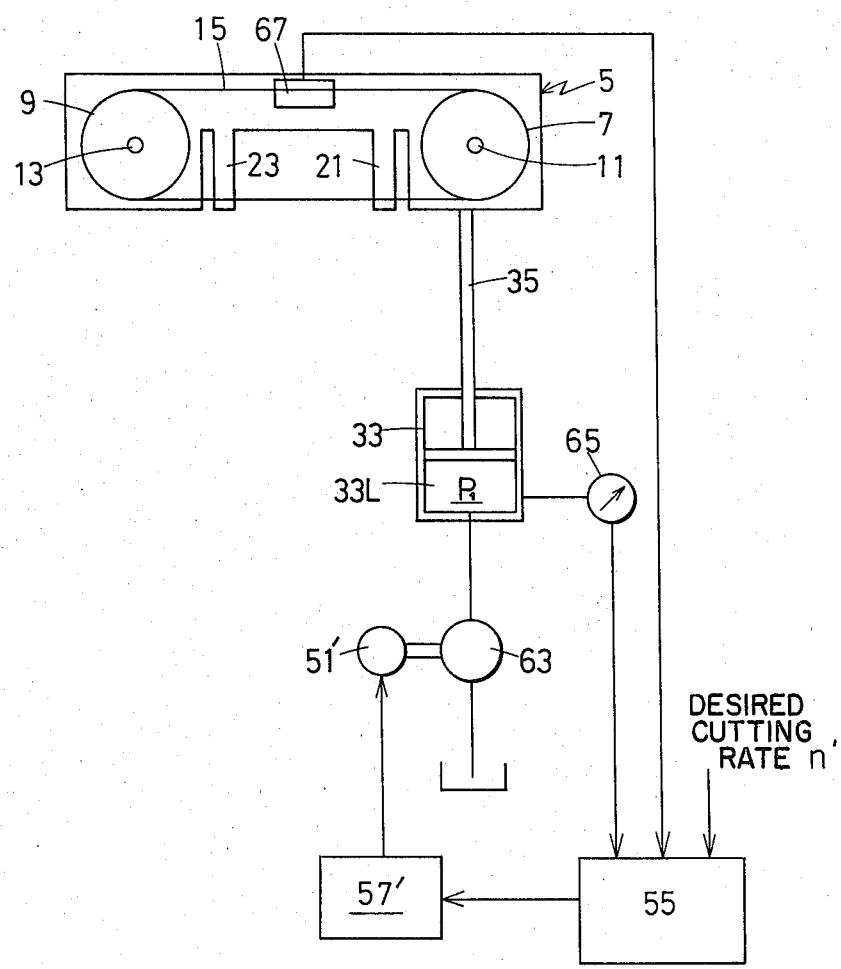

METHOD AND APPARATUS FOR CONTROLLING THE FEEDING OF A BANDSAW BLADE OF HORIZONTAL BANDSAW MACHINES

BACKGROUND OF THE INVENTION

1. Field of the Invention

The present invention relates generally to horizontal band saw machines in which a saw head assembly carrying a band saw blade is lowered during a cutting operation in order to feed the band saw blade into an underlying material to be cut, and, more particularly, pertains to methods and apparatus for controlling the feeding of the band saw blade in horizontal band saw machines.

2. Description of the Prior Art

Horizontal band saw machines conventially comprise a saw head assembly in which a flexible endless band saw blade is trained around a pair of wheels so that it may perform cutting operations when the wheels are driven. The saw head assembly is so arranged as to be raised and lowered in relation to an underlying base supporting the material to be cut. This movement can occur around a hinge pin or along a single or plural guide posts in response to operation of a driving means such as a hydraulic motor. Thus, in cutting operations, the saw head assembly is lowered from the raised position toward the base so as to feed the band saw blade into the material to be cut which has been placed on the base. Also, in most prevailing horizontal band saw machines, the saw head assembly is so arranged as to be raised by a hydraulic motor of a cylinder type when the hydraulic fluid is supplied thereinto and lowered by its own gravity when the hydraulic fluid is drained from the hydraulic motor. In this connection, it is desired that the upper limit of the movement of the band saw blade be made a certain distance higher than the top of the material to be cut so as to prevent the band saw blade from being damaged by the material being fed, since most of materials are usually uneven.

In such horizontal band saw machines, it is desired to feed the band saw blade into the material to be cut so that the cutting action may be performed always at a constant optimum cutting rate which is defined as area (square millimeters) of cut per unit of time. Since many materials such as round bars and shape steels vary in cross-sectional length as they are cut, it is necessary to feed the band saw blade in correlation with the cross-sectional length of the material being cut so as to maintain an optimum cutting rate. Of course, if the band saw blade is not fed at an optimum cutting rate according to the cross-sectional length of the material being cut, it will work too hard and wear prematurely or otherwise work inefficiently.

For the purpose of performing cutting operations at a stated cutting rate according to the cross-sectional length of the material being cut, the band saw blade is conventionally arranged to be fed with a uniform load or feeding force under the so-called load control or pressure control. In order to maintain the load or feeding force constant under the load control, the pressure of the hydraulic motor for the saw head assembly is controlled while the saw head assembly is lowered to feed the band saw blade into the material to be cut. The load control is intended to maintain the cutting resistance constant so as to feed the band saw blade at a uniform cutting rate, since the cutting rate is generally proportional to the cutting resistance. Thus, under the conventional load control, the feeding speed of the band saw blade is controlled as a function of the cross-sectional cut length of the material to be cut so as to keep the cutting resistance constant, while the driven speed of the bandsaw blade is kept unchanged.

The conventional load control, however, is defective especially in that it is based on the premise that the cutting resistance per unit of feeding amount or feeding speed of the bandsaw blade is always uniform or constant. In fact, the cutting resistance per unit of feeding amount of the band saw blade has a tendency to increase as the feeding amount decreases. Accordingly, when the feeding amount is decreased in order to maintain the cutting resistance constant in response to an increase in the cross-sectional length of the material being cut, for instance, the cutting resistance per unit of feeding amount will have a tendency to further increase. The cutting resistance per unit of feeding amount will markedly increase, especially when cutting difficult-to-cut materials such as stainless steels which have to be cut at a low feeding speed or small feeding amount. Thus, the difficult-to-cut materials cannot be cut at a uniform optimum cutting rate by the conventional load control in the horizontal machine, although the easy-to-cut materials which can be cut at a higher feeding speed or larger feeding amount can be cut at a substantially uniform cutting rate under the same conventional load control.

Furthermore, conventional load control has been defective in that it is based on the premise that the cutting resistance will increase or decrease only as a function of the changes of the cross-sectional length of the material being cut. However, the fact is that the cutting resistance will increase regardless of the cross-sectional length of the material being cut as the band saw blade becomes worn. Thus, when the wear of the band saw blade is increased during cutting operations under the conventional load control, the feeding speed of the band saw blade will be dropped without increase of the cross-sectional length of the material being cut with the result that the cutting rate will drop.

SUMMARY OF THE INVENTION

It is a primary object of the present invention to provide methods and apparatus for controlling the feeding of the band saw blade in horizontal band saw machines so that the band saw blade may be fed always at a uniform or constant optimum cutting rate with respect to the cross-sectional cut length of the material being cut regardless of the nature of the material and wear of the band saw blade.

It is another object of the present invention to provide methods and apparatus for controlling the feeding of the band saw blade in horizontal band saw machines whereby the cutting efficiency can be remarkably increased.

It is a further object of the present invention to provide methods and apparatus for controlling the feeding of the band saw blade in horizontal band saw machines whereby the life of the band saw blade can be remarkably lengthened.

Basically, these objects are accomplished by detecting the wear or abrasion of the band saw blade or variations or changes of the cutting resistance caused by such wear or abrasion during a cutting operation and controlling the feeding of the bandsaw blade based upon the detected wear or abrasion or the variations or changes of cutting resistance.

Other and further objects and advantages of the present invention will be apparent from the following description and accompanying drawings which, by way of illustration, show preferred embodiments of the present invention and the principles thereof.

BRIEF DESCRIPTION OF THE DRAWINGS FIG. 1 is a front elevational view of a horizontal band saw machine in which the principles of the present invention can be embodied.

FIGS. 3, 4, 5 and 7 are diagrammatic views of the control system of horizontal band saw machines of the type shown in FIG. 1 embodying the principles of the present invention.

DESCRIPTION OF THE PREFERRED EMBODIMENTS

Figure 1:
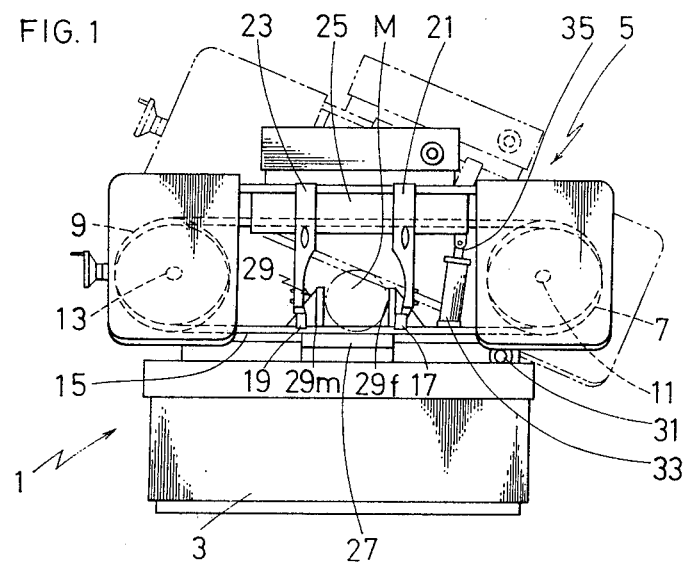

Referring now to FIG. 1, there is shown a horizontal band saw machine which is generally designated by the numeral 1 and comprises a box-like base 3 and a saw head assembly 5 which is conventionally movable toward and away from the base 3. The saw head assembly 5 includes a driving wheel 7 and a driven wheel 9 having shafts 11 and 13, respectively, around which an endless band saw blade 15 is trained so that it may be driven to make a cutting action when the driving wheel 7 is power driven. The band saw blade 15 is slidably held or guided with its cutting edge faced downwardly by a pair of guide assemblies 17 and 19 which are fixed to guide arms 21 and 23, respectively, and are adjustably held by a beam member 25 which is fixed at the upper portion of the saw head assembly 5. A work-table 27 is mounted on the base 3 so that a material M to be cut may be placed thereon. A vise assembly 29 having a fixed jaw 29f and a movable jaw 29m is also mounted on the base 3 to hold the material M to be cut. Also, the saw head assembly 5 is pivotally connected to the base 3 by means of a hinge pin 31 and arranged to be raised and lowered relative to the base 3 by a hydraulic motor 33 of a cylinder type having a piston and rod 35. However, the saw head assembly 5 is so arranged as to be vertically raised away from and lowered toward the base 3 along a vertical guide post or posts by a hydraulic motor or other means, as will be disclosed hereinafter.

In the above described arrangements, when the saw head assembly 5 is lowered from its raised position shown by the imaginary lines in FIG. 1, the band saw blade 15 which is rotating around the driving and driven wheels 7 and 9 in the saw head assembly 5, will be fed into the material M. The material M is held by the vise assembly 29 on the work-table 27. Also, the material M to be cut, which is shown as a round bar in FIG. 1, is horizontally fed on the work-table 27 into the cutting position. Material M is fed usually forwardly from the backside of the horizontal band saw machine 1 after the band saw blade 15 has been raised by the saw head assembly 5 to its upper limit on completion of each cutting cycle.

Figure 2A:
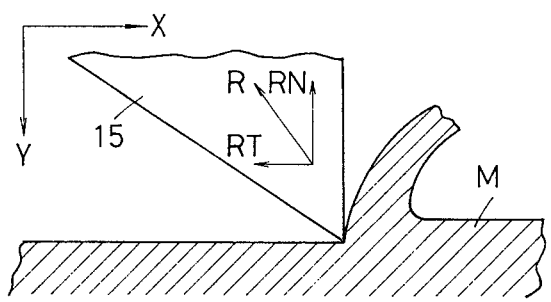
FIGS. 2a and 2b are illustrations regarding the feeding of the band saw blade used in such horizontal band saw machines shown in FIG. 1.
Figure 2B:
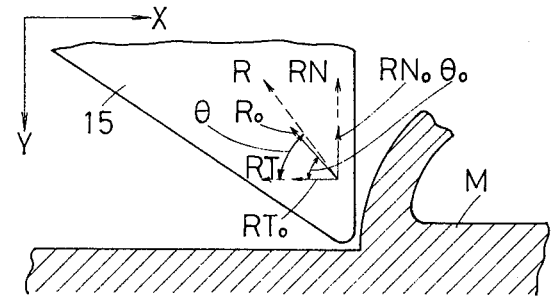

Referring to FIGS. 2a and 2b, in order to theoretically illustrate the cutting action in the horizontal band saw machine 1, there is shown a tooth of the band saw blade 15 running in the X direction and being fed in the Y direction, to cut the material M. As shown FIG. 2a, it will be understood that the cutting resistance R of the band saw blade 15 can be taken as a vector R which is resolved into a transversal component RT in the running direction of the band saw blade 15 and a normal component RN in the feeding direction of the blade.

As to any type of horizontal band saw machine, the cutting rate $\eta$ is expressed as follows:

$$\eta = S/t = L \cdot Vf/t = L \cdot Vt \tag{1}$$

where S is cross-sectional cut area of the material M to be cut, t is time, L is cross-sectional cut length of the material M, Vf is feeding amount of the band saw blade 15 into the material M and Vt is feeding speed of the blade.

Also, the cutting resistance R is expressed as follows:

$$R = A \cdot B(w) \cdot Vt \cdot L \tag{2}$$

where A is a constant of proportion, w is an amount of wear or abrasion of the band saw blade 15 and B(w) is a function of the amount of wear or abrasion of the blade. Thus, by substituting the equation (1) for the equation (2), the following equation is obtained:

$$R = A \cdot B(w) \cdot \eta \tag{3}$$

Furthermore, since the cutting resistance R of the band saw blade 15 in cutting the material M can be resolved into the transversal component Rt and the normal component RN as shown in FIG. 2a, the following equation is obtained:

$$R = \sqrt{RT^2 + RN^2} \tag{4}$$

From the above description, it will be understood that the cutting resistance R can be obtained by detecting the transversal component RT and the normal component RN of the cutting resistance. Also, the feeding of the band saw blade 15 into the material M to be cut can be controlled according to the obtained cutting resistance R.

However, in order to more simply control the feeding of the band saw blade 15 according to only either of the transversal component RT or the normal component RN of the cutting resistance $\eta$, the equation (3) can be changed as follows:

$$RT = At \cdot Bt(w) \cdot \eta \tag{5}$$

and, $$RN = An \cdot Bn(w) \cdot \eta \tag{6}$$

where At and An are constants of proportion which are experimentally obtained previously and Bt(w) and Bn(w) are functions of amounts of wear or abrasion which are also experimentally obtained.

As is now understood from the above description, the band saw blade 15 can be fed into the material M being cut at a desired cutting rate $\eta'$ when the transversal component RT or the normal component RN of the cutting resistance R satisfies the equation (5) or (6) in which the cutting rate $\eta$ is substituted for such a desired cutting rate $\eta'$ for the material M. Thus, the band saw blade 15 can be fed at the desired cutting rate $\eta'$ even when the cutting resistance R is increased because of the wear of the band saw blade 15 if the transversal component RT or the normal component RN is increased in proportion to the increase of the function Bt(w) or Bn(w) because of the wear of the band saw blade 15 so as to satisfy the equation (5) or (6). In this connection, of course the desired cutting rate $\eta'$ can be experimentally obtained for various materials to be cut for the purpose of controlling the feeding of the band saw blade 15.

Referring particularly to FIG. 2b, the cutting of the band saw blade 15 will be described with regard to the cutting resistance R and the wear or abrasion w during a cutting operation. In FIG. 2b, the cutting resistance R of the band saw blade 15 at the beginning of cutting is shown as a vector $R_0$ which is resolved into a transversal component $RT_0$ in the running direction of the band saw blade 15 and a normal component $RN_0$ in the feeding direction of the blade and has a direction of an angle $\theta_0$ to the transversal component $RT_0$. Also, the cutting resistance R of the band saw blade 15 after having been more or less worn is shown as another vector R which is resolved into a transversal component RT and a normal component RN and has a direction of an angle $\theta$ to the transversal component RT.

As is now understood, the vector $R_0$ at the beginning of cutting is increased to change to the vector R and the angle $\theta_0$ showing the direction of the vector $R_0$ is changed to the angle $\theta$ showing the direction of the vector R. Thus, the angle $\theta$ of the vector R can be obtained by detecting the transversal component RT and the normal component RN and based upon the following equation:

$$\theta = \tan^{-1} RN/RT \quad (7)$$

Also, if the magnitude and the direction shown by the angle $\theta$ of the vector of the cutting resistance R is previously experimentally obtained, the function B(w) of the equation (3) can be expressed as follows:

$$B(w) = C(\theta) \quad (8)$$

where $C(\theta)$ is a function of the angle $\theta$ showing the increase of the cutting resistance R because of the wear w of the band saw blade 15. Thus, the equation (3) can be transformed as follows:

$$R = A \cdot C(\theta) \cdot \eta \quad (9)$$

From the above description, it will be understood that the band saw blade 15 can be fed into the material M to be cut at a desired cutting rate $\eta'$ when the cutting resistance R satisfies the equation (9) in which the cutting rate $\eta$ is substituted for such a desired cutting rate $\eta'$ for the material M. Thus, the band saw blade 15 can be fed at the desired cutting rate $\eta'$ even when the cutting resistance R is increased because of the wear of the band saw blade 15 if the cutting resistance R is increased in proportion to the increase of the function $C(\theta)$ because of the wear of the band saw blade 15 so as to satisfy the equation (9). As has been described hereinbefore, the desired cutting rate $\eta'$ can be experimentally obtained for various materials to be cut for the purpose of controlling the feeding of the band saw blade 15.

Figure 3:
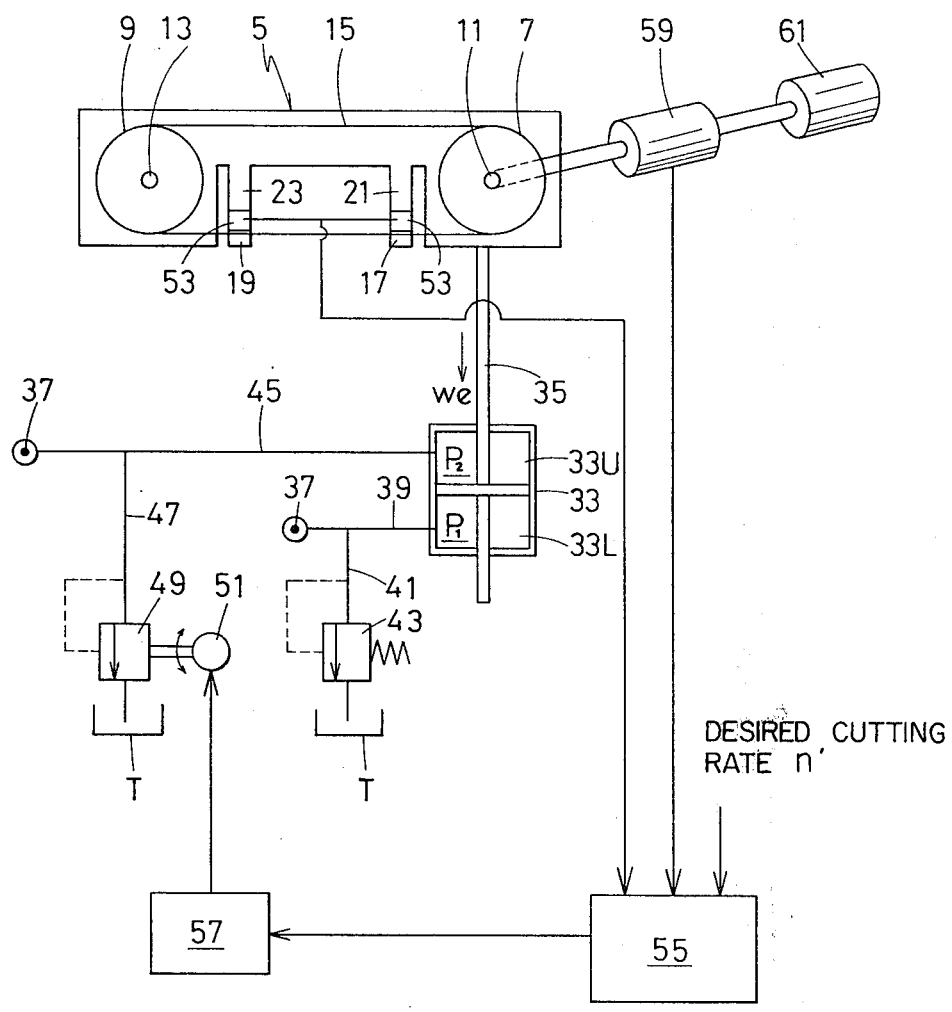

Referring now to FIG. 3, there is shown a first embodiment of the present invention for feeding the band saw blade 15. It will be seen that the saw head assembly 5 carrying the band saw blade 15 is raised and lowered by the piston and rod 35 of the hydraulic motor 33 around a hinge pin or along a guide post or posts.

The hydraulic motor for raising and lowering the saw head assembly 5 is provided with an upper chamber 33U and a lower chamber 33L divided from each other by the piston and rod 35. The lower chamber 33L of the hydraulic motor 33 is connected to a hydraulic source 37 by a passage 39 which is connected to a relief valve 43 through a passage 41. Relief valve 43 is connected to the hydraulic tank T and is so arranged as to control the hydraulic pressure $P_1$ of the lower chamber 33L. The upper chamber 33U of the hydraulic motor 33 is also connected to the hydraulic source 37 by a passage 45 which is connected to an electric relief valve 49 through a passage 47. The electric relief valve 49 is connected to the hydraulic tank T and is so arranged as to be driven by a motor 51 to control the hydraulic pressure $P_2$ of the upper chamber 33U. Thus, the hydraulic pressure $P_1$ of the lower chamber 33L and the hydraulic pressure $P_2$ of the upper chamber 33U of the hydraulic motor 33 can be controlled by the electric relief valve 43 and the relief valve 49, respectively, to control the motion of the saw head assembly 5 and therefore the feeding of the band saw blade 15. Also, it will be understood that the weight or gravity of the saw head blade assembly 5 will act as a feeding force for urging the saw head assembly 5 to feed the band saw blade 15 into the material M to be cut, but the feeding force will be determined by the pressures $P_1$ and $P_2$ of the lower and upper chambers 33L and 33U, respectively, of the hydraulic motor 33.

The action of the hydraulic motor 33 controlling the motion of the saw head assembly 5 and the feeding of the band saw blade 15 will be theoretically described with the area of the piston and rod 35 to be pressurized and the weight of the saw head assembly 5 expressed as Ar and We, respectively. Firstly, the pressure $P_1$ of the lower chamber 33L of the hydraulic motor 33 is expressed as follows:

$$P_1 = We/Ar \quad (10)$$

Thus, when the relief valve 49 is set to the pressure $P_1$, and the pressure $P_2$ of the upper chamber 33U of the hydraulic motor 33 is zero, the weight We of the saw head assembly 5 and the pressure $P_1$ of the lower chamber 33L of the hydraulic motor 33 are balanced with each other and therefore the saw head assembly 5 will not be lowered to feed the band saw blade 15 into the material M to be cut.

In order to feed the band saw blade 15 into the material M to be cut with a desired cutting resistance R', the electric relief valve 49 has to be controlled to keep the hydraulic pressure $P_2$ of the upper chamber 33U as follows:

$$P_2 = R'/Ar \quad (11)$$

Thus, the feeding force F for feeding the band saw blade 15 into the material M to be cut is expressed as follows:

$$F = We + P_2 \cdot Ar - P_1 \cdot Ar \quad (12)$$

By substituting the equations (10) and (11) for the equation (12), the following equation can be obtained:

$$F = We + (R'/Ar) \cdot Ar - (We/Ar) \cdot Ar = R' \quad (13)$$

As will be now understood from the above description, cutting resistance R' will satisfy the equation (9) to feed the band saw blade 15 into the material M being cut at the desired cutting rate $\eta'$.

In order to detect the normal component RN of the cutting resistance R described hereinbefore with reference to FIGS. 2a and 2b, load detecting means 53 such as pressure elements are disposed at the guide assemblies 17 and 19 in such a manner as to detect the cutting resistance or reaction urged to the back of the band saw blade 15 during cutting operation. The load detecting means 53 is so arranged as to transmit the detected normal component RN of the cutting resistance R to a computing processing unit 55 which is connected to a pressure controlling means 57 for controlling the motor 51 for the electric relief valve 49.

Also, in order to detect the transversal component RT of the cutting resistance R, a torque detecting means 59 is provided between the shaft 11 of the driving wheel 7 which drives the band saw blade 15 and the motor 61 which drives the driving wheel 7. The torque detecting means 59 is so arranged as to transmit the detected transversal component RT of the cutting resistance R to the computing processing unit 55.

The computing processing unit 55 is programmed with the computations based upon the equations (4), (7) and (9), and it is stored with the desired cutting rate $\eta'$ which is predetermined according to the nature of the material M to be cut and the constant of proportion A and the function $C(\theta)$ of the equation (9) which are experimentally predetermined. The computing processing unit 55 is so arranged as to obtain the actual cutting resistance R and the angle $\theta$ showing the direction of the vector of the cutting resistance R based upon the equations (4) and (7), respectively, and according to the transversal and normal components RT and RN of the cutting resistance R. As has been described hereinbefore, the transversal and normal components RN and RT of the cutting resistance are detected and transmitted to the computing processing unit 55 by the load detecting means 53 and the torque detecting means 59, respectively. The computing processing unit 55 is also so arranged as to obtain the desired cutting resistance R' based upon the equation (9) and according to the obtained angle $\theta$ showing the direction of the vector of the cutting resistance R and the function $C(\theta)$ and the constant of proportion A which are both previously stored. Furthermore, the computing processing unit 55 is so arranged as to compare the obtained cutting resistance R and the obtained desired cutting resistance R' and then direct the pressure controlling means 57 to keep the cutting resistance R and the desired cutting resistance R' equal to each other.

The pressure controlling means 57 is so arranged as to control the electric relief valve 49 by means of the motor 51 according to the directional signals given by the computing processing unit 55 so as to keep the pressure of the upper chamber 33U of the hydraulic motor 33 at $P_2 = R'/Ar$, expressed as the equation (11). In other words, the pressure controlling means 57 is so arranged as to control the hydraulic motor 33 by means of the electric relief valve 49 to lower the saw head assembly 5 to feed the band saw blade 15 in the material M to be cut with the upper chamber 33U of the hydraulic motor 33 kept at the pressure $P_2 = R'/Ar$.

As has been described, the band saw blade 15 is fed into the material M to be cut by the hydraulic motor 33 by means of the saw head assembly 5 with the hydraulic pressure of the upper chamber 33U of the hydraulic motor 33 kept at $P_2 = R'/Ar$ expressed as the equation (11) according to the present invention. When the hydraulic pressure of the upper chamber 33U of the hydraulic motor 33 is kept at $P_2 = R'/Ar$, the band saw blade 15 is fed into the material with a feeding force which is equal to the desired cutting resistance R' as is expressed by the equation (13). As will be now understood, when the feeding force is equal to the desired cutting resistance R', the bandsaw blade 15 is fed into the material M to be cut at the desired cutting rate $\eta'$ with the equation (9) satisfied.

Figure 4:
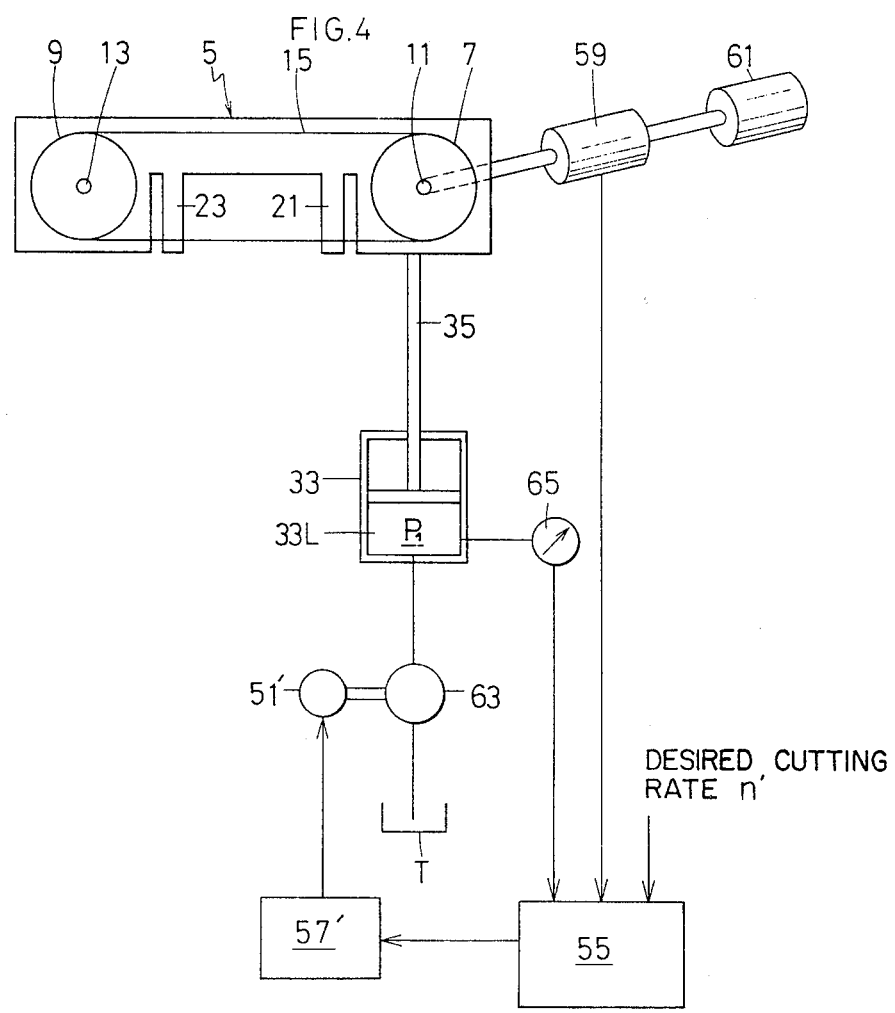

Referring to FIG. 4, there is shown a second embodiment of the present invention which is more or less similar to the first embodiment shown in FIG. 3. For the purpose of simplification, elements common to the first and second embodiments will be given the same reference numerals and will not be described in detail.

In the second embodiment, the saw head assembly 5 is so arranged as to be raised by the hydraulic motor 33 when the hydraulic fluid is supplied into the lower chamber 33L of the hydraulic motor 33 and be lowered by its own weight or gravity when the hydraulic fluid is exhausted from the lower chamber 33L. The lower chamber 33L of the hydraulic motor 33 is connected for drainage to the hydraulic tank T by means of an adjustable flow control valve 63 such as a metering valve which is controlled by a motor 51' which, in turn is controlled by a flow controlling means 57'. Thus, the feeding speed of the band saw blade 15 cutting into the material M to be cut is controlled by the hydraulic fluid drained from the lower chamber 33L of the hydraulic motor 33 through the adjustable flow control valve 63 which is controlled by the flow controlling means 57' through the motor 51'.

In the above described arrangement, the hydraulic pressure $P_1$ of the lower chamber 33L of the hydraulic motor 33 is expressed as follows:

$$P_1 = (We - RN)/Ar \tag{14}$$

where We, Ar and RN are the weight of the saw head assembly 5, the area of the piston and rod 35 to be pressurized and the normal component of the cutting resistance R, respectively, as expressed hereinbefore. By transforming the equation (14), the following equation is obtained:

$$RN = We - Ar \cdot P_1 \tag{15}$$

Thus, it will be understood that the normal component RN of the cutting resistance R can be obtained by detecting the hydraulic pressure $P_1$ of the lower chamber 33L of the hydraulic motor 33.

A pressure detecting means 65 is connected to the lower chamber 33L of the hydraulic motor 33 for detecting the hydraulic pressure $P_1$ and obtaining the normal component RN of the cutting resistance R. Also, in order to transmit the hydraulic pressure $P_1$ of the lower chamber 33L of the hydraulic motor 33, the pressure detecting means 65 is connected to the computing processing unit 55 which functions in more or less the same manner as in the first embodiment shown in FIG. 3.

The computing processing unit 55 is connected to the flow controlling means 57' to give directional signals thereto as will be described hereinafter, and it is connected to the torque detecting means 59 which operates in the same manner as in the first embodiment. As has been described with regard to the first embodiment, the torque detecting means 59 is provided between the shaft 11 of the driving wheel 7 and the motor 61 in order to detect and transmit to the computing processing unit 55 the transversal component RT of the cutting resistance R.

The computing processing unit 55 in this embodiment is programmed with the computations based upon the equations (4), (7), (9) and (15), and stored therein are the desired cutting rate $\eta'$ and the constant A of proportion and the function $C(\theta)$ of the equation (9) in all the same manner as the first embodiment shown in FIG. 3. The computing processing unit 55 is so arranged as to firstly obtain the normal component RN of the cutting resistance R based upon the equation (15) and according to the hydraulic pressure $P_1$ of the hydraulic motor 33 and then obtain the actual cutting resistance R based upon the equation (4) and according to the obtained normal component RN and the transversal component RT. As has been described hereinbefore, the hydraulic pressure $P_1$ of the lower chamber 33L of the hydraulic motor 33 and the transversal component RT of the cutting resistance R are detected and transmitted to the computing processing unit 55 by the pressure detecting means 65 and the torque detecting means 59, respectively. The computing processing unit 55 is also so arranged as to obtain the angle $\theta$ showing the direction of the vector of the cutting resistance R based upon the equation (7) and according to the obtained normal component RN and the given transversal component RT of the cutting resistance R. Furthermore, the computing processing unit 55 is so arranged as to obtain the desired cutting resistance R' and then compare the obtained cutting resistance R and the obtained desired cutting resistance R' with each other so as to give directional signals to the flow controlling means 57' in the same manner as described in the first embodiment.

The flow controlling means 57' is arranged to control the adjustable flow control valve 63 by means of the motor 51' according to the directional signals given by the computing processing unit 55. The flow controlling means 57' is equivalent to the pressure controlling means 57 in the first embodiment, but it is designed to control the flow of the hydraulic fluid draining out of the lower chamber 33L of the hydraulic motor 33 by means of the adjustable flow control valve 65 in order to control the feeding speed of the band saw blade 15 expressed in the equation (2).

In the above described arrangement, it will be understood that the cutting resistance R of the equation (2) is controlled correspondingly when the feeding speed Vt of the band saw blade 15 of the same equation is controlled by the flow controlling means 57' by means of the flow control valve 63.

Also, the flow controlling means 57' will control the feeding speed Vt of the band saw blade 15 to keep the cutting resistance R equal to the desired cutting resistance R' according to the directional signals given by the computing processing unit 55 which directs the flow controlling means 57' in the same manner as described in the first embodiment. Thus, it will be understood that the cutting rate $\eta$ is kept uniform or constant when the cutting resistance R is kept equal to the desired cutting resistance R' by the flow controlling means 57', since the equation (9) is satisfied.

Figure 5:
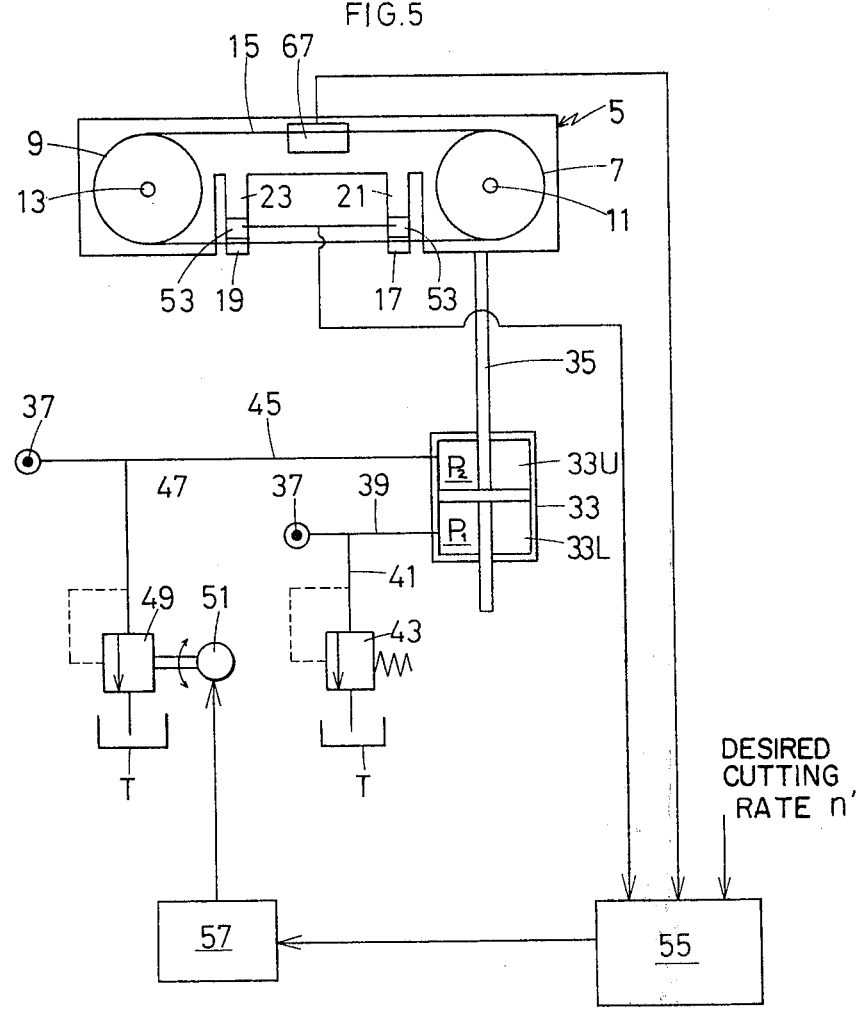

Referring to FIG. 5, there is shown a third embodiment of the present invention which is very similar to the first embodiment shown in FIG. 3 and is also more or less similar to the second embodiment shown in FIG. 4. For the purpose of simplification, elements common to the first and second embodiments will be given the same reference numerals in the third embodiment and will not be described in detail.

This third embodiment is different structurally from the first embodiment only in that a wear detecting means 67 is employed instead of the torque detecting means 59 so as to detect the wear or abrasion of the bandsaw blade 15. The wear detecting means 67 is connected to the computing processing unit 55, which is more or less the same as the first and second embodiments so as to transmit the detected wear of the band saw blade 15 to the the computing processing unit. Elements other than the wear detecting means 67 of the third embodiment are the same as those of the first embodiment, although the computing processing unit 55 is arranged in a more or less different manner. To be brief, the third embodiment is different from the first embodiment in that the hydraulic pressure $P_2$ of the upper chamber 33U of the hydraulic motor 33 is controlled according to the wear w of the band saw blade 15 detected by the wear detecting means 67 and based upon the equation (6).

Figure 6:
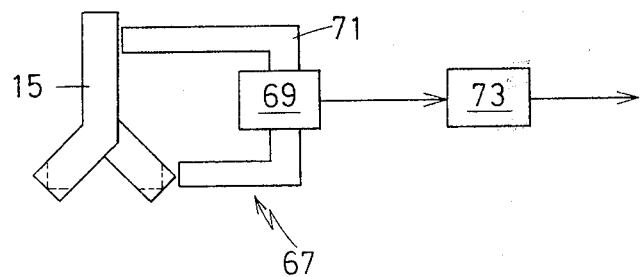
FIG. 6 is an illustration of the wear detecting means of FIGS. 5 and 7.

The wear detecting means 67 will be easily designed to the purpose by those skilled in the art so as to detect the wear w of the band saw blade 15 during a cutting operation. For instance, the wear detecting means 67 may be, as shown in FIG. 6, a magnetic detecting means constructed of a coil 69 and a core 71 which may be connected with an average circuit 73, and it can be provided on the upper stretch of the band saw blade 15 between the driving and driven wheels 7 and 9.

In the third embodiment, the computing processing unit 55 is programmed with the computation of only the equation (6), and stored therein are the desired cutting rate $\eta'$ and the constant of proportion An and the function Bn(w) of the equation (6). The desired cutting rate $\eta'$ is predetermined for various materials to be cut in the same manner as the first and second embodiments, and the of proportion An and the function Bn(w) are experimentally predetermined. The computing processing unit 55 is designed to obtain the desired normal component RN' of the cutting resistance R based upon the equation (6) and according to the wear w of the band saw blade 15 given by the wear detecting means 67 and the desired cutting rate $\theta'$ and the constant of proportion An and the function Bn(w) which are previously stored. The computing processing unit 55 is also arranged to compare the desired normal component RN' of the cutting resistance R obtained in the above described manner and the normal component RN which is given by the load detecting means 53 in the same manner as described in the first embodiment. Furthermore, the computing processing unit 55 is so arranged in the same manner as described in the first embodiment to direct the pressure controlling means 57 to keep the normal component RN and the desired normal component RN' of the cutting resistance R equal to each other.

The pressure controlling means 57 is arranged to control the electric relief value 49 by means of the motor 51 according to the directional signals given by the computing processing unit 55 so as to keep the pressure of the upper chamber 33U of the hydraulic motor 33 at $P_2 = RN'/Ar$ in the same manner as described in the first embodiment. Thus, the pressure controlling means 57 will control the hydraulic motor 33 by means of the electric relief valve 49 to feed the band saw blade 15 into the material M to be cut with the upper chamber 33U of the hydraulic motor 33 kept at the pressure $P_2 = RN'/Ar$.

As is readily apparent, the band saw blade 15 is fed into the material M with a feeding force which is equal to the desired normal component RN' of the cutting resistance R when the hydraulic pressure of the upper chamber 33U of the hydraulic motor 33 is kept at $P_2 = RN'/Ar$. Thus, it will be understood that the band saw blade 15 is fed into the material M to be cut at the desired cutting rate $\eta'$ with the equation (6) satisfied when the feeding force is equal to the desired normal component RN' of the cutting resistance R.

Referring to FIG. 7, there is shown a fourth embodiment of the present invention which is very similar to the second embodiment shown in FIG. 4 and is also more or less similar to the first and the third embodiments shown in FIGS. 3 and 5, respectively. For the purpose of simplification, elements of this fourth embodiment will be given the same reference numerals as the preceding embodiments and will not be described in detail, since all the elements are common to the preceding embodiments.

The fourth embodiment is different structurally from the second embodiment only in that the wear detecting means 67 of the third embodiment is used instead of the torque detecting means 59 of the second embodiment. The wear detecting means 67 is connected to the computing processing unit 55, which is more or less the same as the preceding embodiments, and transmits the detected wear of the band saw blade 15 to the computing process unit in the same manner as described in the third embodiment. Elements other than the wear detecting means 67 of the fourth embodiment are all the same as in the second embodiment, although the computing processing unit 55 is arranged in a more or less different manner. Briefly stated, the fourth embodiment is different from the second embodiment in that the feeding speed Vt of the band saw blade 15 is controlled according to the wear w of the band saw blade 15 detected by the wear detecting means 67 and based upon the equation (6).

In the fourth embodiment, the computing processing unit 55 is programmed with the equations (6) and (15), and stored therein are the desired cutting rate $\eta'$ and the constant of proportion An and the function Bn(w) of the equation (6). The desired cutting rate $\eta'$ is predetermined for various materials to be cut and the constant of proportion An and the function Bn(w) are experimentally predetermined in the same manner as described in the preceding embodiments. The computing processing unit 55 is arranged to firstly obtain the normal component RN of the cutting resistance R based upon the equation (15) and according to the hydraulic pressure $P_1$ of the hydraulic motor 33 in the same manner as described in the second embodiment. Also, the computing processing unit 55 is arranged to obtain the desired normal component RN' of the cutting resistance R based upon the equation (6) and according to the wear w of the band saw blade 15 given by the wear detecting means 67 and the desired cutting rate $\eta'$ and the constant of proportion An and the function Bw(w) in the same manner as described in the third embodiment. Furthermore, the computing processing unit 55 is arranged to compare the obtained normal component RN and the desired normal component RN' of the cutting resistance R with each other so as to give directional signals to the flow controlling means 57' in the same manner as described in the second embodiment. The flow controlling means 57' is arranged in the same manner as the second embodiment to control the flow of the hydraulic fluid draining out of the lower chamber 33L of the hydraulic motor 33 by means of the adjustable flow control valve 65 to control the feeding speed of the band saw blade 15 expressed in the equation (2).

From the above description, it will be understood that the flow controlling means 57' will control the feeding speed Vt of the band saw blade 15 to keep the normal component RN and the desired normal component RN' of the cutting resistance R equal to each other according to the directional signals given by computing processing unit 55 in the same manner as described in the second embodiment. Thus, the band saw blade 15 will be fed into the material M to be cut at the desired constant cutting rate $\eta'$ since the normal component RN and the desired normal component RN' are kept equal to each other with the equation (6) satisfied.

As has been far described in the above, the cutting resistance R of the band saw blade 15 is kept equal to the desired cutting resistance R' by controlling the feeding force or the feeding speed of the band saw blade 15 to keep the cutting rate $\eta$ constant and equal to the desired cutting rate $\eta'$ experimentally predetermined according to the present invention. Thus, it will be understood the various objects described earlier hereinbefore can be accomplished according to the present invention.

Although a preferred form of the present invention has been illustrated and described, it should be understood that the device is capable of modification by one skilled in the art without departing from the principles of the invention herein involved. Accordingly, the scope of the invention is to be limited only by the claims appended hereto.

I claim:

1. A method for controlling the feeding amount of a horizontal band saw blade comprising the steps of:
   detecting changes in the wear of the band saw blade during a cutting operation; and
   controlling the feeding amount of the band saw blade in accordance with the detected changes in the wear of the band saw blade.

2. A method for controlling the feeding amount of a horizontal band saw blade comprising the steps of:
   detecting a change in the transversal and normal components of the band saw blade which correspond to wear of the blade; and
   controlling the feeding amount of the band saw blade in accordance with variations in the wear of the band saw blade defined by changes in the detected transversal and normal components.

3. An apparatus for controlling the feeding amount of a horizontal band saw blade so as to obtain a constant optimum cutting rate, said apparatus comprising:
   detecting means for detecting a change in the amount of transversal and normal components of the band saw blade which correspond to the abrasion of the blade;
   a computing process unit for generating signals defining the amount of the desirable cutting resistance from said detected transversal and normal components and a constant optimum cutting rate; and pressure controlling means for controlling the cutting resistance in response to said signals generated by said computing process unit.

4. An apparatus for controlling the feeding amount of a horizontal band saw blade so as to obtain a constant optimum cutting rate, and said apparatus comprising:

first means for detecting the amount of the wear of said band saw blade;

second means for detecting the amount of cutting resistance;

a computing process unit for generating signals corresponding to the amount of the desirable cutting resistance from said amount of wear detected, said amount of cutting resistance detected and a constant optimum cutting rate; and pressure controlling means to control the cutting resistance in response to said signals generated by said computer process unit.

* * * * *